S. W. SLOCUMB.
Running-Gear.
No. 66,049.
Patented June 25, 1867.
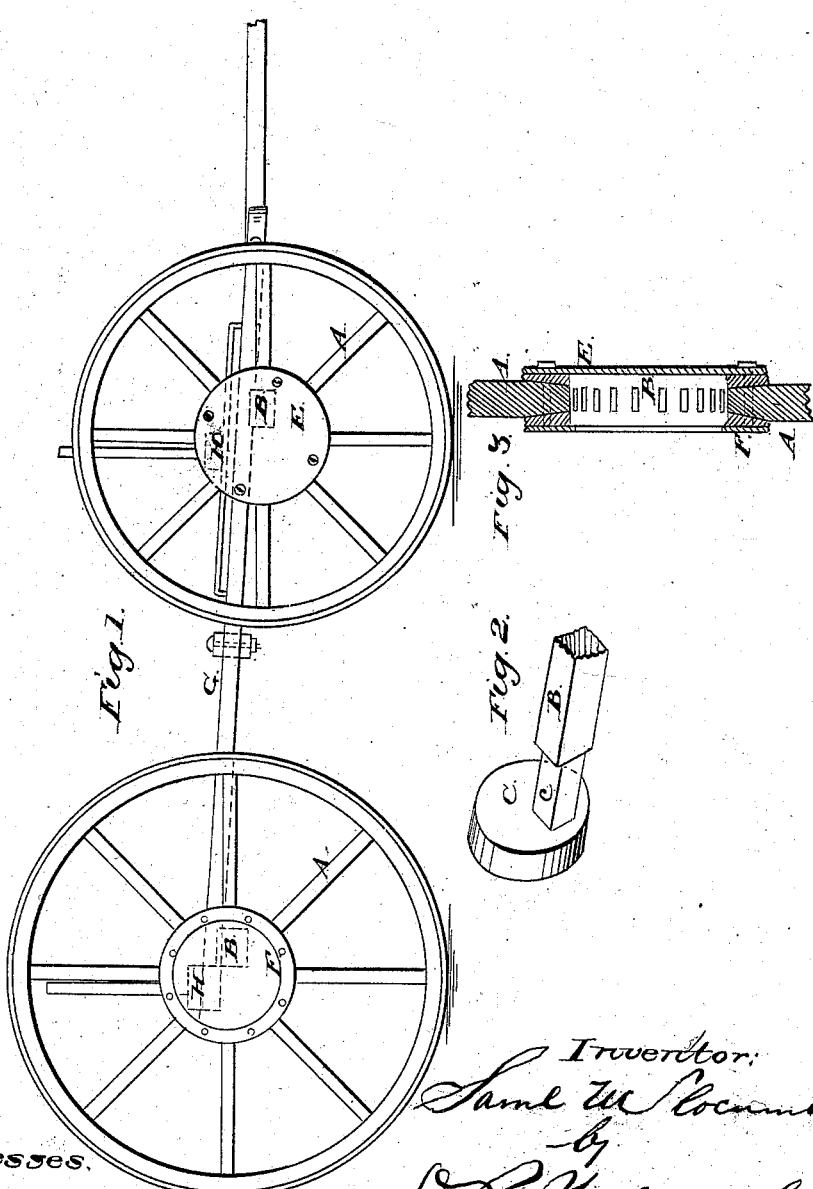

UNITED STATES PATENT OFFICE.

S. W. SLOCUMB, OF ALBANY, ILLINOIS.

IMPROVEMENT IN WAGONS.

Specification forming part of Letters Patent No. 66,049, dated June 25, 1867.

*To all whom it may concern:*

Be it known that I, SAMUEL W. SLOCUMB, of Albany, in the county of Whitesides and State of Illinois, have invented a new and useful Improvement in Wagons; and I do hereby declare that the following is a full, clear, and exact description of the same, reference being had to the annexed drawings, making part of this specification, in which—

Figure 1 is a side elevation. Fig. 2 is a perspective view of the end of the axle, and Fig. 3 is a vertical section of the hub.

The same letters are used in all the figures in the designation of the same parts.

A A are the wheels, and B B the axles, of a wagon. C are the thimbles, which are constructed with sockets to receive the ends of the axles. In the ordinary wagons these thimbles are made tapering, and pass through the center of the hub of the wheel. I propose to make the circular bearing C on the end of the thimble, which is attached eccentrically, so that the axle shall not be on a line with the center of the wheel, but shall be in front of the said line. The center of the circular bearing C corresponds with the center of the wheel.

D is the hub of the wheel, which I prefer to make of cast-iron. It is a ring of metal, formed to fit over the circular bearing C, and with mortises in its periphery to receive the ends of the spokes. E is a metallic plate, fitting over the outside of the hub, and fastened on by screws. The wheel is held in place on the circular bearing by the metallic ring F, the opening in which is of less diameter than that of the bearing. This ring is fastened to the inner face of the hub by screws, which must be removed when the wheel is to be taken off.

The thimble may be attached at the center of the bearing C, though I prefer the attachment eccentrically, as shown. In the latter case, in order to bring the weight of the load over the center of the wheel, the braces G are extended beyond the axle, and the front and hind bolsters H are placed behind the axle, and slightly behind the center of the wheel.

What I claim as my invention, and desire to secure by Letters Patent, is—

1. The circular bearing C, in combination with the hub D, when constructed substantially as described.

2. The combination of the circular bearing C, hub D, plate E, and ring F, substantially as described.

3. The circular bearing C, when attached eccentrically to the axle, and in front of a line passing through the center of the wheels, substantially as described.

4. The arrangement of the bolsters H, when placed in rear of the axle, and the axle when placed in front of a line passing through the center of the wheels, substantially as described.

In testimony whereof I have signed my name to this specification in the presence of two subscribing witnesses.

S. W. SLOCUMB.

Witnesses:
W. W. DURANT,
J. C. MITCHELL.